(12) United States Patent
Yamaguchi et al.

(10) Patent No.: US 6,202,810 B1
(45) Date of Patent: Mar. 20, 2001

(54) LOCK-UP CLUTCH MECHANISM OF TORQUE CONVERTER

(75) Inventors: Mitsugu Yamaguchi, Hirakata; Takeyuki Nakamura, Shijonawate; Hideki Miura, Hirakata, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/425,220

(22) Filed: Oct. 22, 1999

(30) Foreign Application Priority Data

Oct. 26, 1998 (JP) .................................................. 10-303490

(51) Int. Cl.⁷ .................................................. F16H 45/02
(52) U.S. Cl. ........................................... 192/3.29; 192/212
(58) Field of Search ..................................... 192/3.29, 3.3, 192/212, 214, 214.1; 464/63, 64, 65, 66, 67, 68

(56) References Cited

U.S. PATENT DOCUMENTS

| | | | |
|---|---|---|---|
| 4,027,757 | * 6/1977 | Radke et al. ..................... | 192/3.29 X |
| 4,949,822 | * 8/1990 | Martin ................................ | 192/3.3 |
| 5,046,591 | * 9/1991 | Hageman et al. .................. | 192/3.29 |
| 5,186,292 | * 2/1993 | Hageman et al. .............. | 192/3.29 X |
| 6,026,941 | * 2/2000 | Maienschein et al. ............. | 192/3.29 |

FOREIGN PATENT DOCUMENTS

| | | |
|---|---|---|
| 44 24 988 | 6/1995 | (DE) . |
| 195 15 302 | 11/1995 | (DE) . |
| 44 24 986 | 1/1996 | (DE) . |
| 198 38 444 | 4/1999 | (DE) . |

OTHER PUBLICATIONS

*Dubbel*, Taschenbuch für den Maschinenbau, 15*ᵗʰ* Edition; p. 961; 1983.

* cited by examiner

Primary Examiner—Rodney H. Bonck
(74) Attorney, Agent, or Firm—Shinjyu Global IP Counselors, LLP

(57) ABSTRACT

A lock-up clutch mechanism (7) includes a piston member (44), a drive member (52), a driven member (53), and a torsion spring (54). The piston member (44) is arranged between the front cover (14) and the turbine (19), such that the piston member (44) moves freely in an axial direction for engaging with and disengaging from the front cover (14). The drive member (52) includes a pair of plate elements (56) and (57), to which torque is inputted from the piston member (44). The plate elements (56) and (57) are axially arranged side by side and are fixedly couple to each other and define a spring receiving section. The driven member (53) extends between the plate elements (56) and (57) and has a window hole (58) corresponding to the spring receiving section. The torsion spring (54) is retained within the window hole (58) and is supported by the spring receiving section. The torsion spring (54) elastically couples the plate elements (56) and (57) and the driven member (53) in a rotational direction. The plate elements (56) and (57) are manufactured by a drawing process in which the plate elements (56) and (57) are drawn to different draw depths respectively. A thickness of one of the plate elements having a longer draw depth is smaller than a thickness of the other of the plate elements having a shorter draw depth.

5 Claims, 3 Drawing Sheets

LOCK-UP CLUTCH MECHANISM OF TORQUE CONVERTER

BACKGROUND OF THE INVENTION

A. Field of the Invention

The present invention relates to a lock-up clutch mechanism, more particularly, to a lock-up clutch mechanism arranged within a torque converter for transmitting torque from a front cover of the torque converter to a transmission side of the torque converter.

B. Description of the Related Art

The torque converter is a device that has a torus, which includes three different runners, i.e., an impeller, a turbine and a stator, and transmits driving force via hydraulic fluid contained in the torus. The torque converter generally includes a lock-up clutch mechanism arranged in a space between the front cover and the torus.

The lock-up clutch mechanism is a device that allows for selective mechanical transmission of torque from the front cover to the transmission side of the torque converter and includes a clutch coupler and a damper mechanism. The clutch coupler includes a piston, which is freely moveable in an axial direction, and a friction member, which is provided on the piston. The clutch coupler engages with or disengages from the front cover in accordance with hydraulic pressure changes within the torque converter. The damper mechanism is composed of, for example, a plurality of torsion springs and is capable of absorbing or reducing torque fluctuation, which is transmitted from the clutch coupler, by the torsion springs.

The damper mechanism in the lock-up clutch mechanism is generally located at an outer peripheral region in order to reduce an axial size of the entire lock-up clutch mechanism.

However, there are also lock-up clutches that include a damper mechanism that is located radially inner peripheral regions thereof. In a case of a lock-up clutch mechanism in which the damper mechanism is arranged at the inner peripheral region of the turbine, the torsion springs constituting the damper mechanism are held between two disk-like plate elements acting as a torque input side member, and a torque output side member is arranged between these plate elements and engages with the torsion springs. A problem with such configurations is providing the two disk-like plates with appropriate portions that support the springs.

SUMMARY OF THE INVENTION

Accordingly, one object of the present invention to increase strength of the lock-up clutch mechanism while reducing the weight of the lock-up clutch mechanism for improving fuel consumption of vehicles having the lock-up clutch mechanism.

In accordance with one aspect of the present invention, a lock-up clutch mechanism of a torque converter mechanically couples a front cover of the torque converter and a turbine of the torque converter. The lock-up clutch mechanism includes a drive member having a pair of disk-like plate elements axially arranged side by side and fixedly coupled to each other. At least one of the plate elements formed with a drawn portion defining an annular recess. A driven member is axially arranged between the plate elements and extends into the annular recess. The driven member is formed with a window hole corresponding to portion of the annular recess. A torsion spring is disposed within the window hole and a portion of the annular recess and the torsion spring elastically couples the pair of plate elements and the driven member in a rotational direction. The pair plate elements are manufactured by a drawing process and the plate element formed with the drawn portion is formed with a thickness that is less than the thickness of the other of the plate elements.

Preferably, the lock-up clutch mechanism also includes a piston member that is disposed between the front cover and the turbine, the piston member being movable in an axial direction within the torque converter. The piston member is adapted to be selectively engageable with the front cover of the torque converter. Radial outer peripheral portions of the plate elements are adapted to engage the piston such that the piston may undergo axial movement with respect to the plate members and the turbine, and the piston and the plate members rotate together.

Preferably, the annular recess and the drawn portion are formed at a radially inward portion of the plate elements.

Preferably, the plate element formed with the drawn portion is positioned adjacent to the piston and the other of the plate elements is positioned adjacent to the turbine of the torque converter.

Preferably, the annular recess extends in an axial direction toward the front cover closer to the front cover than the radial outer peripheral portions of the plate elements.

The present invention provides the torque converter with a reduced axial thickness. The present invention also provides the torque converter with a reduced weight since one of the plate elements has a reduced thickness without reducing torque transmission strength.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

Figure 1:
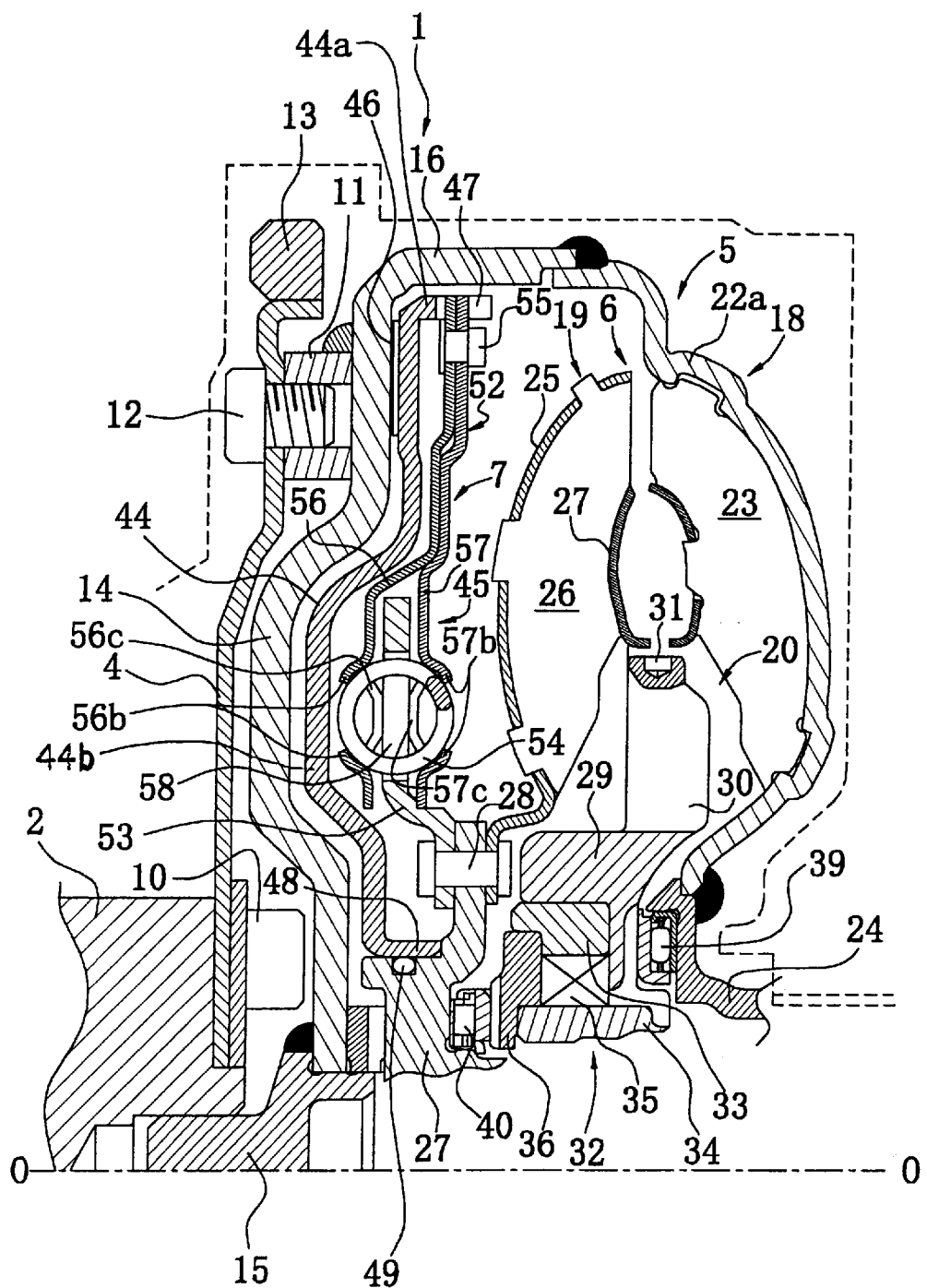
FIG. 1 is a fragmentary, longitudinal cross-sectional side view of a torque converter in accordance with one embodiment of the present invention.

FIG. 1 is a longitudinal cross-sectional view of a torque converter 1 according to one embodiment of the present invention. The torque converter 1 is a device that transmits torque from a crankshaft 2 of an engine to an input shaft (not shown) of a transmission. The undepicted engine is arranged on the left side of FIG. 1, and the undepicted transmission is arranged on the right side of FIG. 1. A rotational axis of the torque converter 1 is indicated with a line 0—0 in FIG. 1.

The torque converter 1 is mainly composed of a flexible plate 4 and a main body 5. The flexible plate 4 is a disk-like thin plate element for transmitting torque and absorbing bending vibration that is transmitted from the crankshaft 2 to the torque converter 1.

The main body 5 of the torque converter 1 is composed of a torus 6, which includes three different runners, i.e., an impeller 18, a turbine 19 and a stator 20, and a lock-up clutch mechanism 7.

A front cover 14 is a disk-like member and is arranged adjacent to the flexible plate 4. A center boss 15 is secured to an inner peripheral region of the front cover 14 by welding. The center boss 15 is an axially extending cylindrical member and is inserted into a center hole of the crankshaft 2.

An inner peripheral region of the flexible plate 4 is secured to the crankshaft 2 by a plurality of bolts 10. A plurality of nuts 11 are circumferentially equidistantly arranged along and secured to an outer peripheral region of the front cover 14 on the engine side thereof. Bolts 12, which are threadably engaged with the corresponding nuts 11, secure an outer peripheral region of the flexible plate 4 to the front cover 14. An annular inertia member 13 is secured to the outer peripheral region of the flexible plate 4.

An outer peripheral tubular section 16 is arranged at the outer peripheral region of the front cover 14 and extends axially on the transmission side of the front cover 14. An outer peripheral edge of an impeller shell 22a of the impeller 18 is secured to a distal end of the outer peripheral tubular section 16 by welding. Therefore, the front cover 14 and the impeller 18 define a hydraulic fluid chamber that is filled with hydraulic fluid. The impeller 18 is mainly composed of the impeller shell 22a, a plurality of impeller blades 23, which are secured to an interior surface of the impeller shell 22a, and an impeller hub 24, which is secured to an inner peripheral region of the impeller shell 22a.

The turbine 19 is axially opposed to the impeller 18 within the hydraulic fluid chamber. The turbine 19 is mainly composed of a turbine shell 25 and a plurality of turbine blades 26, which are secured to a surface of the turbine shell 25 on the impeller side thereof. An inner peripheral region of the turbine shell 25 is secured to a flange of the turbine hub 27 by a plurality of rivets 28.

The turbine hub 27 is connected to an input shaft (not shown) in non-rotatable manner relative to the input shaft.

The stator 20 is a mechanism for adjusting return flow of the hydraulic fluid from the turbine 19 to the impeller 18. The stator 20 is a single member that is molded from resin, aluminum alloy or the like. The stator 20 is arranged between the inner peripheral region of the impeller 18 and the inner peripheral region of the turbine 19. The stator 20 is mainly composed of an annular carrier 29, a plurality of stator blades 30, which are arranged at an outer peripheral surface of the carrier 29, and an annular core 31, which is secured to distal ends of the stator blades 30. The carrier 29 is supported by a fixed shaft (not shown) via a one-way clutch 32.

The one-way clutch 32 includes an outer race 33, which is secured to the carrier 29, an inner race 34, which is secured to the fixed shaft, and a plurality of members 35, which are arranged between the outer race 33 and the inner race 29. A thrust bearing 39 is arranged between the carrier 29 and the impeller hub 24. An annular engaging member 36 is axially arranged at the outer race 33 of the one-way clutch 32 on the engine side thereof. The engaging member 36 prevents dislodgement of the members 35 of the one-way clutch 32 in an axial direction. A thrust bearing 40 is arranged between the engaging member 36 and the turbine hub 27.

The lock-up clutch mechanism 7 will now be described in details.

The lock-up clutch mechanism 7 is mainly composed of a piston member 44 and a damper mechanism 45.

The piston member 44 is a disk-like member that is axially located relative to and adjacent to the front cover 14 on the transmission side of the front cover 14. The piston member 44 has an annular recess 44b, which is axially recessed on the engine side by drawing process, at a radially intermediate section of the piston member 44. The front cover 14 has an annular recess, which is axially recessed on the engine side along the recess 44b of the piston member 44. An inner peripheral tubular section 48 is arranged at an inner peripheral region of the piston member 44 and extends axially on the transmission side of the piston member 44. The inner peripheral tubular section 48 is supported by an outer peripheral surface of the turbine hub 27 in such a manner that the inner peripheral tubular section 48 is freely rotatable relative to the turbine hub 27 and is axially moveable. Movement of an axial end of the inner peripheral tubular section 48 located on the transmission side thereof is restricted when it abuts against the flange of the turbine hub 27, so that the axial end of the inner peripheral tubular section 48 is allowed to move axially only to a predetermined position on the transmission side. A seal ring 49 is arranged in the outer peripheral surface of the turbine hub 27. The seal ring 49 seals axially opposed spaces from each other at the inner peripheral region of the piston member 44.

An outer peripheral region of the piston member 44 acts as a clutch coupler. An annular friction facing 46 is secured to the outer peripheral region of the piston member 44 on the engine side thereof. The friction facing 46 is opposed to a flat annular friction surface that is formed at an inner surface of the outer peripheral region of the front cover 14. A tubular section 44a is formed on the outer peripheral region of the piston member 44 to extend on the transmission side of the piston member 44. A plurality of slots 47 are arranged at equal angular intervals in the tubular section 44a.

Figure 2:
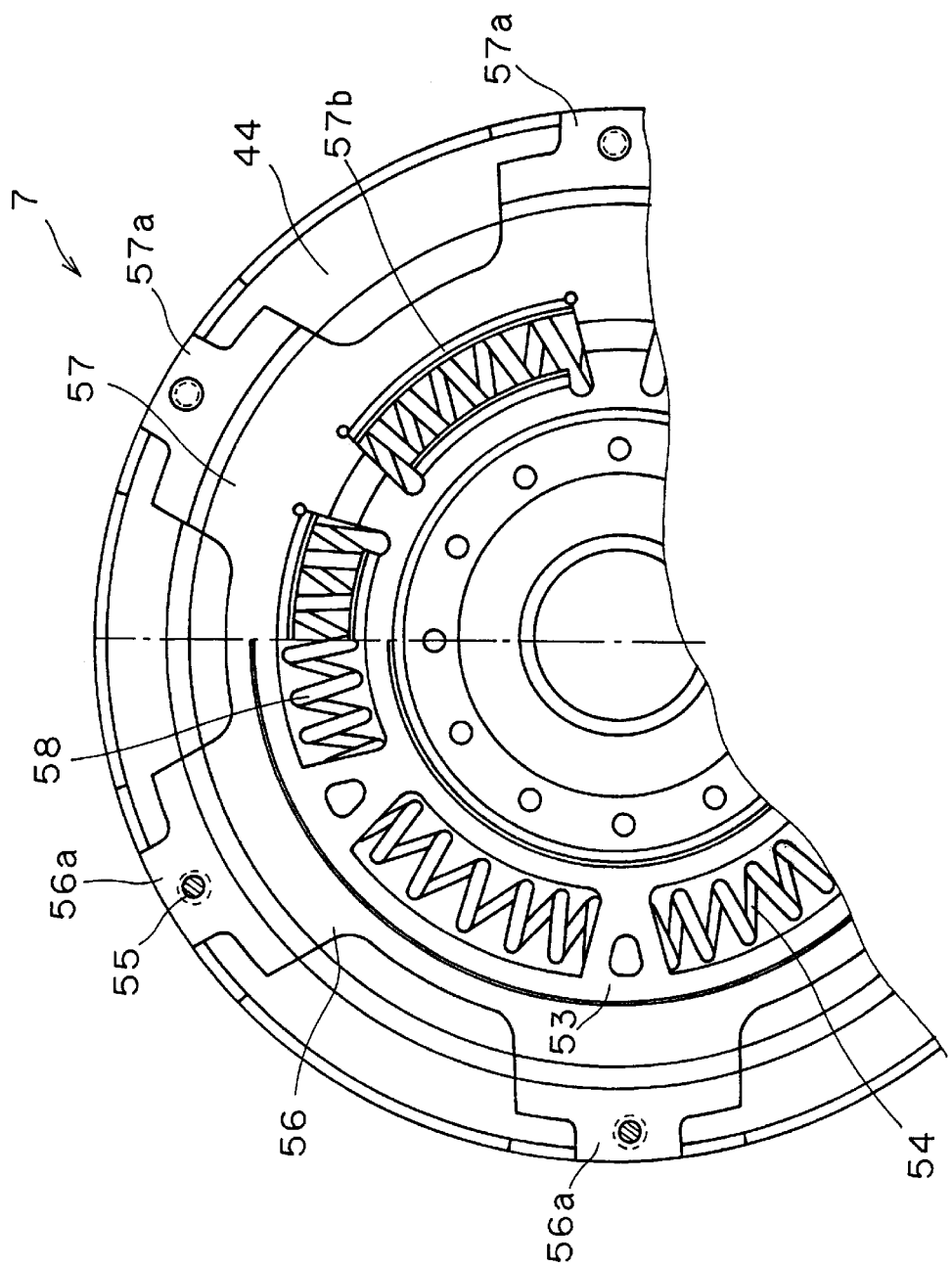
FIG. 2 is a fragmentary plan view of a damper mechanism of a lock-up clutch mechanism of the torque converter depicted in FIG. 1.
Figure 3:
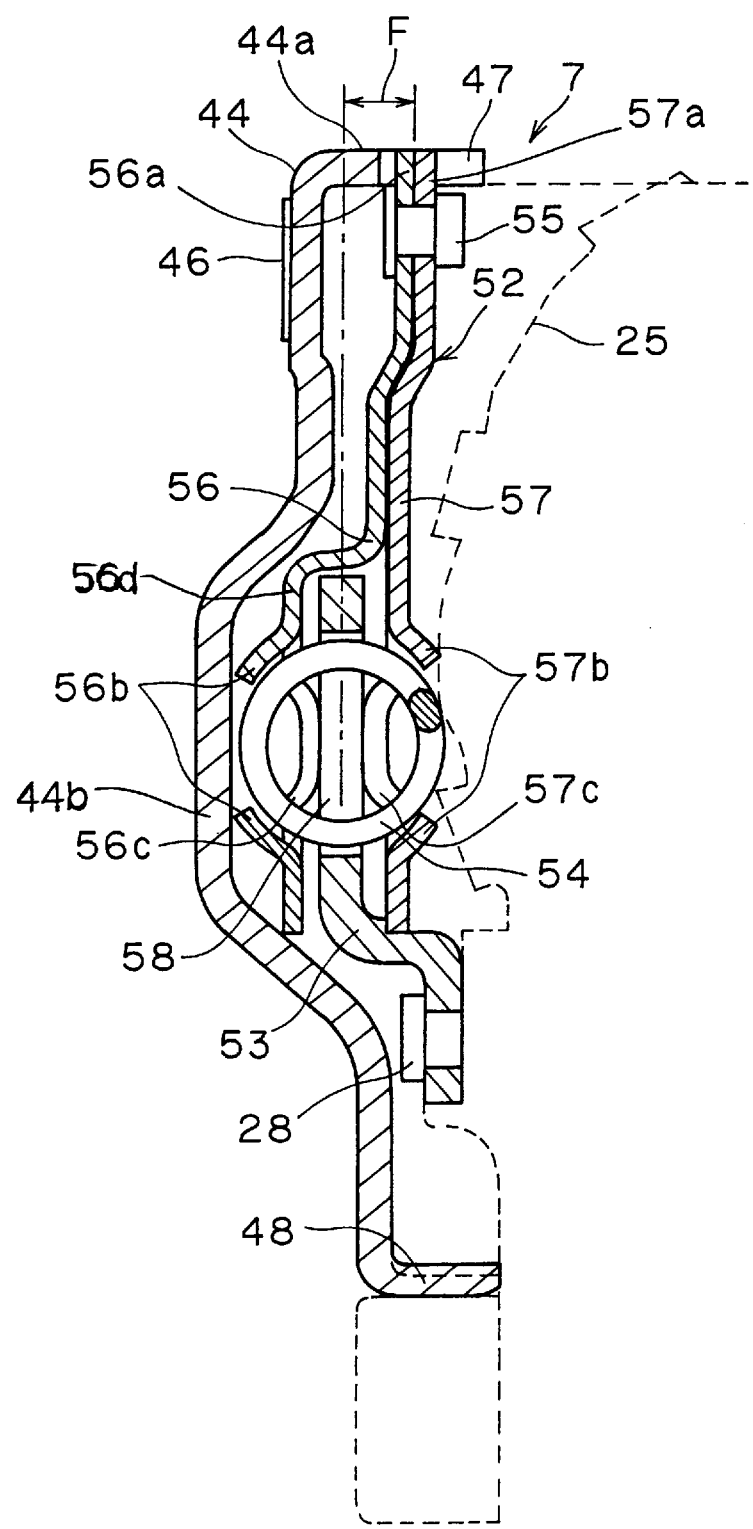
FIG. 3 is a longitudinal cross-sectional view of the damper mechanism, shown with portions of the torque converter removed to provide greater clarity.

With reference to FIGS. 2 and 3, the damper mechanism 45 is composed of a drive member 52, which is includes a pair of plate elements 56, 57, a driven member 53 and a plurality of torsion springs (elastic couplers) 54. With reference to FIG. 2, a part of the damper mechanism 45 with the plate element 57 removed is shown on the left side of the alternating long and short dash line in FIG. 2.

The plate elements 56, 57 constituting the drive member 52 are axially arranged side by side. Each plate element 56, 57 has a plurality of radially outwardly extending projections 56a, 57a along the outer peripheral region thereof. The opposing projections 56a, 57a of the plate elements 56, 57 are engaged together and are secured together by a plurality of rivets 55. Each pair of the opposing projections 56a, 57a engages with the corresponding slot 47 formed in the tubular section 44a of the piston member 44, and acts as a torque input section to which torque is inputted or transmitted from the piston member 44. Because of this engagement, relative movement of the piston member 44 and the drive member 52 in an axial direction is allowed, and the piston member 44 and the drive member 52 can rotate together in a rotational direction.

Inner peripheral regions of the plate elements 56, 57 are axially spaced apart from each other. That is, a drawn portion 56d of the plate element 56 extends toward the engine side and toward the front cover 14. The drawn portion 56d is formed by a drawing process whereby the plate element 56 is deformed in order to form the annular shaped drawn portion 56d. Furthermore, the plate element 56 is located closer to the front cover 14 than the plate element 57 and the plate element 56 has a thickness that is smaller than the thickness of the plate element 57. Preferably, the plate element 56 has a thickness of 1.6 mm, and the other plate element 57 has a thickness of 2.0 mm. A plurality of cut and bent sections 56b 57b, which are cut and then bent outwardly, are arranged circumferentially along each of the axially separated inner peripheral regions of the plate elements 56, 57. The cut and bent sections 56b, 57b act as supporting elements for supporting the torsion springs 54. In this construction, the torque input sections 56a, 57a and the torsion springs 54 are axially offset from each other for a distance F, as shown in FIG. 3.

The driven member 53 is a disk-like member. The driven member 53 is axially arranged between the axially separated inner peripheral regions of the first and second plate elements 56, 57, and is secured to the flange of the turbine hub 27 at its inner peripheral region with a plurality of rivets 28. A plurality of window holes 58 are formed in the driven member 53 to correspond with the supporting elements 56b, 57b. Each window hole 58 is elongated in a circumferential direction.

Each torsion spring 54 is received within the corresponding window hole 58 and the corresponding supporting elements 56b, 57b and extends in a circumferential direction. The opposite circumferential ends of each torsion spring 54 are supported by the corresponding window hole 58 and supporting elements 56c, 57c. Furthermore, axial movement of each torsion spring 54 is restricted by the cut and bent sections of the supporting elements 56b, 57b.

Operation according to the present invention will now be described.

When torque is transmitted from the undepicted engine to the crankshaft 2, the torque is further transmitted to the front cover 14 through the flexible plate 4 and, then, to the impeller 18. The hydraulic fluid driven by the impeller blades 23 of the impeller 18 rotates the turbine 19. The torque of the turbine 19 is outputted to the undepicted input shaft through the turbine hub 27. The hydraulic fluid flowing from the turbine 19 to the impeller 18 passes through the stator 20 toward the impeller 18.

When the hydraulic fluid residing in a space between the front cover 14 and the piston member 44 is drained from the inner peripheral side of the space, the piston member 44 is moved toward the front cover 14 due to hydraulic pressure difference, and the friction facing 46 is urged against the friction surface of the front cover 14. Therefore, the torque is transmitted from the front cover 14 to the turbine hub 27 through the lock-up clutch mechanism 7.

In the lock-up clutch mechanism 7, the torque is transmitted from the piston member 44 to the drive member 56, 57. The torque from the drive member 56, 57 is transmitted to the driven member 53 through the torsion springs 54 and is then transmitted to the turbine hub 27. In this stage, torque fluctuation is absorbed or reduced by expansion and compression of the torsion springs 54.

In the lock-up clutch mechanism of the present invention, where the damper mechanism is located at an inner peripheral region of the turbine, it is desirable to the annular drawn portion 56d extending toward the engine side in both the front cover and the piston because the presence of such drawn portions provide strength and rigidity to the members formed with such drawn portions (and recesses). As can be seen in FIGS. 1 and 3, the torsion springs 54 are arranged at least partially within the recess formed by the drawn portion 56d. Further, the torsion springs 54 are disposed between the drawn portion 56d and an adjacent of the plate element 57 so that the torsion springs and the radial outward portions of the plate elements 56, 57 are not arranged in the same plane. Specifically, the torsion springs are arranged closer to the engine that the outer peripheral regions of the plate elements 56, 57. In such a case, the center of gravity of the outer peripheral portions of the plate elements 56, 57 is axially offset from the center of gravity of the torsion springs 54.

Furthermore, the plate elements 56, 57 are constructed to retain the torsion springs therebetween. However, the plate element 57 is not formed with a recessed or drawn portion in the vicinity of the drawn portion 56d, in the depicted embodiment. It should be understood that if the plate elements 56 and 57 were to be made with the same thickness, the inclusion of the drawn portion 56d would make the plate element 56 more rigid than the plate element 57. Therefore, the inclusion of the drawn portion 56d allows the thickness of the plate element 56 to be reduced but still maintains the plate element 56 at about the same strength as the plate element 57 with respect to torque transmission in the lock-up clutch mechanism.

Specifically, the plate element 57 does not include a drawn portion in the vicinity of the drawn portion 56d and therefore, if the plate elements 56 and 57 were made with the same thickness, the plate element 57 would have a flexibility compared to the plate element 56 due to the presence of the drawn portion 56d in the plate element 56.

It should be understood that, although the plate element 57 does not include a drawn portion in the vicinity of the plate element 56, the plate element 57 could be formed with a drawn portion having a draw depth that is less than the draw depth of the drawn portion 56d. The drawn portions of the two plate elements 56 and 57 would still be axially offset from one another in order to retain the springs therebetween, and the axially offset portions would be offset by differing amounts with respect to the outer peripheral portions of the each respective plate element.

In the disclosed embodiment, when torque from the engine is inputted to the plate elements, both of the plate elements 56 and 57 receive and transmit the same magnitude of torque and force. However, since draw depths of these plate elements are not the same, the plate elements have different rigidities. Specifically, the plate element located on the engine side has higher rigidity due to the draw effect. Therefore, the plate element 56 located on the engine side experiences smaller stress in comparison to that of the plate element 57.

Since the draw depth of the drawn portion 56d of the plate element 56 is greater than any drawn depth of the other plate element 57, the rigidity of the plate element 56 is greater than that of the plate element 57 due to the draw effect if both the plate elements 56, 57 have the same thickness. Therefore, in the depicted embodiment, a thickness of the plate element 56 is set to 1.6 mm, and a thickness of the plate element 57 is set to 2.0 mm, such that both the plate elements 56, 57 experience substantially the same stresses in response to torque transmission. As a result, both the plate elements 56, 57 have substantially the same durability. Therefore, the durability of the entire drive member 52 can be improved, and the weight of the lock-up clutch mechanism can be reduced.

In sum, in accordance with the present invention, since the thicknesses of the two plate elements constituting the drive member and having different draw depths are different from each other, the weight of the lock-up clutch mechanism can be reduced while the strengths of the plate elements are maintained.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A lock-up clutch mechanism of a torque converter for mechanically coupling a front cover of the torque converter and a turbine of the torque converter, the lock-up clutch mechanism comprising:

a drive member having a pair of disk-like plate elements axially arranged side by side and fixedly coupled to each other, at least one of said plate elements formed with a drawn portion defining an annular recess;

a driven member axially arranged between said plate elements and extending into said annular recess, said driven member being formed with a window hole corresponding to portion of said annular recess;

a torsion spring disposed within said window hole and a portion of said annular recess, said torsion spring elastically coupling said pair of plate elements and said driven member in a rotational direction;

wherein said pair of plate elements are manufactured by a drawing process and said plate element formed with said drawn portion is formed with a thickness that is less than the thickness of the other of said plate elements.

2. The lock-up clutch mechanism according to claim 1, further comprising:

a piston member disposed between the front cover and the turbine, said piston member being movable in an axial direction within the torque converter, said piston member adapted to be selectively engageable with the front cover of the torque converter; and wherein radial outer peripheral portions of said plate elements are adapted to engage said piston member such that said piston member may undergo axial movement with respect to said plate members and the turbine, and said piston member and said plate members rotate together.

2q3. The lock-up clutch mechanism according to claim 2, wherein said annular recess and said drawn portion are formed at a radially inward portion of said plate elements.

4. The lock-up clutch mechanism according to claim 3, wherein said plate element formed with said drawn portion is positioned adjacent to said piston member and said other of said plate elements is positioned adjacent to the turbine of the torque converter.

5. The lock-up clutch mechanism according to claim 2, wherein said annular recess extends in an axial direction toward the front cover closer to the front cover than said radial outer peripheral portions of said plate elements.

* * * * *